Sept. 8, 1953
W. L. MURPHY
CONTINUOUS ICE-CREAM FREEZER AND METHOD OF MAKING ICE CREAM
2,651,186
Filed Jan. 17, 1951
2 Sheets-Sheet 1
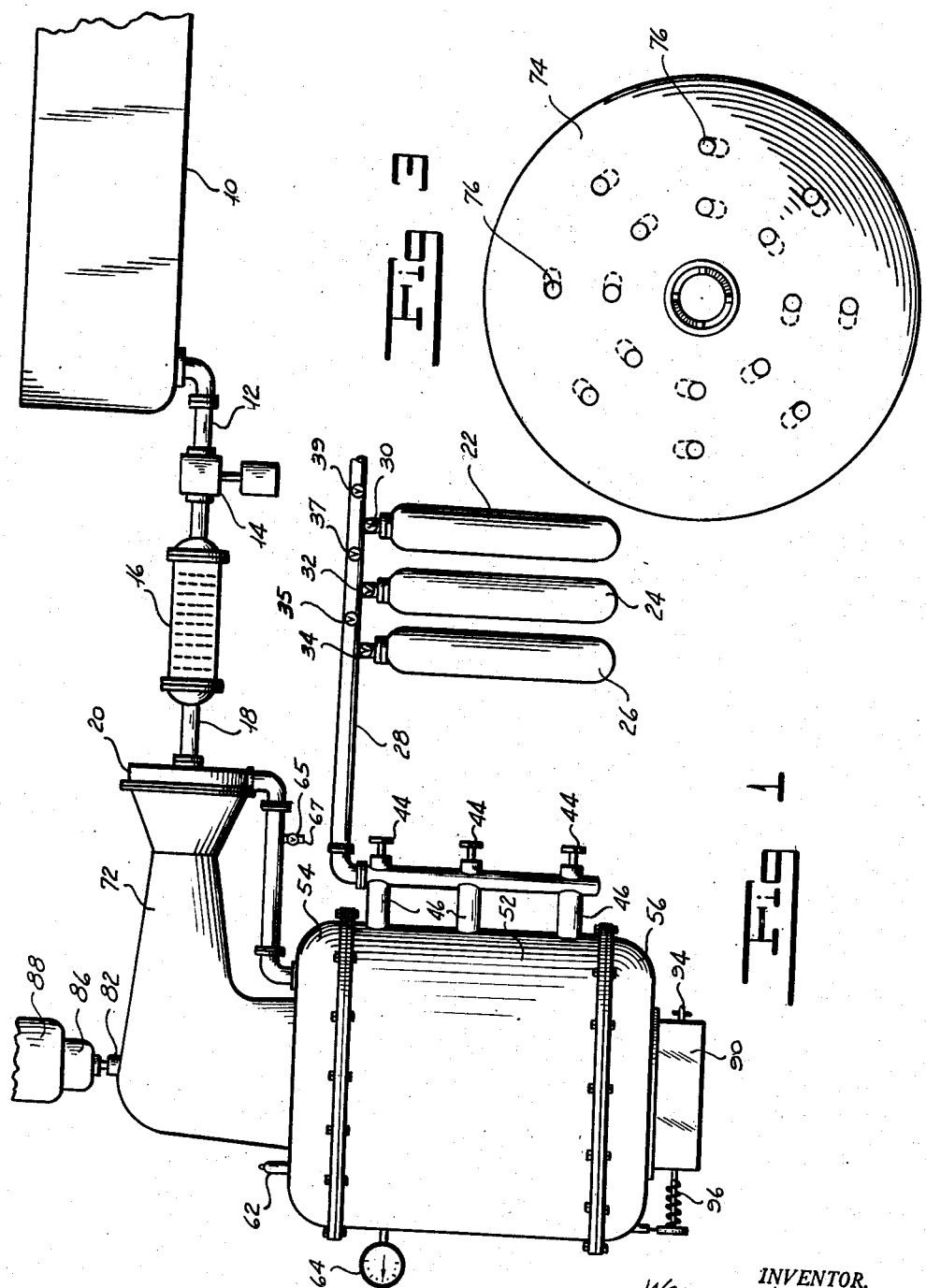
INVENTOR.
WALTER L. MURPHY
BY
ATTORNEY

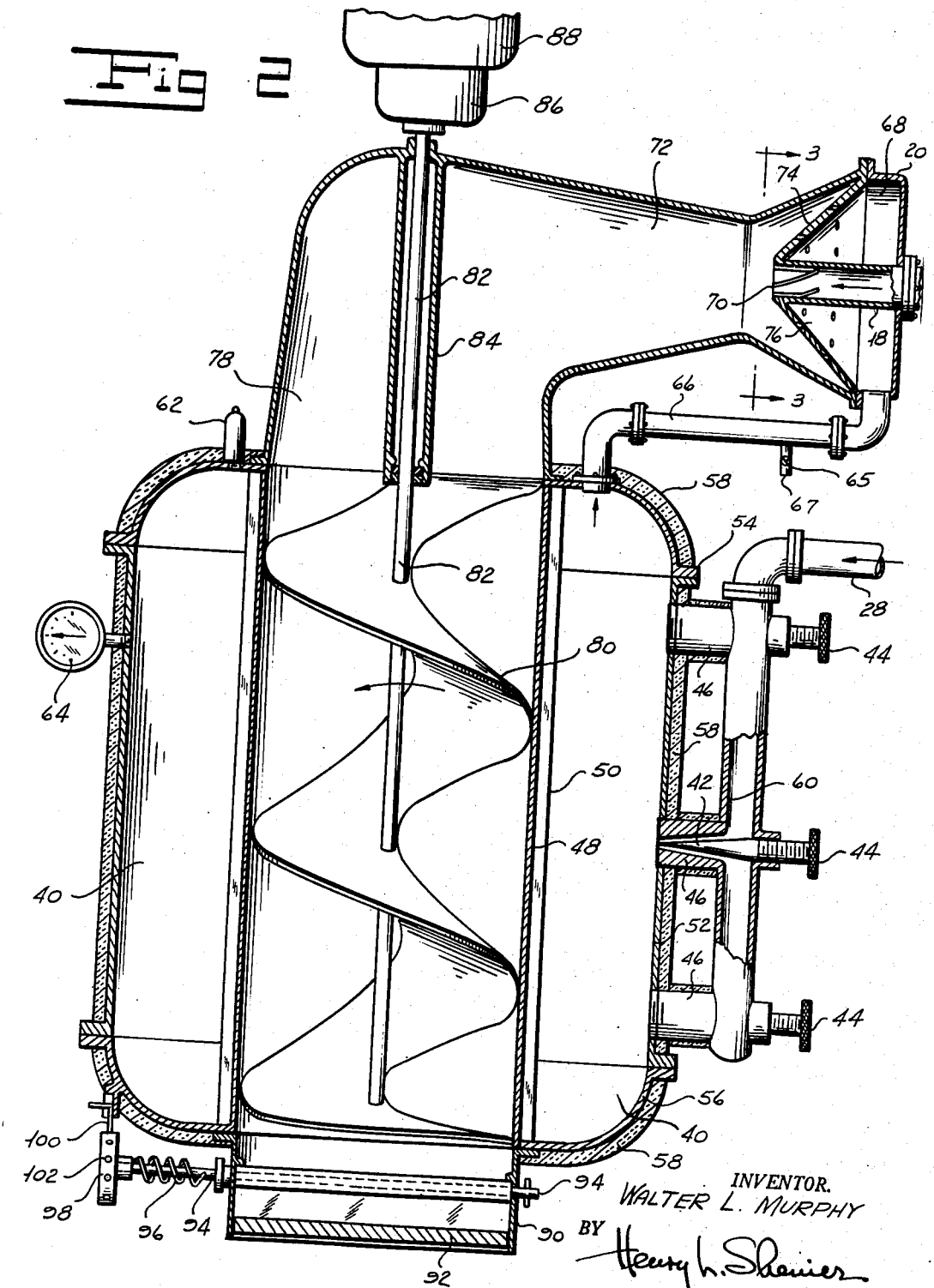

Patented Sept. 8, 1953

2,651,186

UNITED STATES PATENT OFFICE 2,651,186

CONTINUOUS ICE-CREAM FREEZER AND METHOD OF MAKING ICE CREAM

Walter L. Murphy, Kansas City, Mo., assignor to De-Raef Corporation, Kansas City, Mo., a corporation of Missouri Application January 17, 1951, Serial No. 206,378

10 Claims. (Cl. 62—114)

My invention relates to a continuous ice cream freezer and a method of making ice cream and more particularly to an improved continuous ice cream freezer of simplified construction and an improved method of making ice cream in which the refrigeration load is reduced.

Ice cream freezers of the prior art employ mechanical refrigeration and are complicated and expensive pieces of equipment. In the process of freezing, air is incorporated with the ice cream mix to obtain a desired overrun. The inclusion of small particles of air makes a whipped ice cream mix having such particles of air incorporated therein difficult to freeze. Each particle of air acts as a small dead air space and hence insulation. In the freezing process it is necessary to chill the air to freezing temperature. As a result of the physical make-up of a whipped ice cream mix a large refrigeration capacity is necessary. In the prior art methods the air becomes chilled by the enclosing walls of the mix constituents.

One object of my invention is to provide a continuous ice cream freezer of low cost in which no mechanical refrigeration is employed.

Another object of my invention is to provide a continuous ice cream freezer in which bottled compressed inert gas such as air or nitrogen is expanded to provide the necessary refrigeration by heat exchange and to precool the ice cream mix by incorporating the chilled expanded gas with the ice cream mix as the gas used in obtaining overrun.

Another object of my invention is to provide a continuous ice cream freezer which is simple to operate.

Another object of my invention is to provide a method of continuously freezing ice cream in which the refrigeration load is reduced by incorporating a chilled gas in the ice cream mix to obtain overrun .

Other and further objects of my invention will appear from the following description.

In general, my invention contemplates the provision of a refrigeration jacket about a tube through which the ice cream to be frozen passes. Bottle air or nitrogen is expanded into the jacket to provide a refrigerating medium which will freeze the ice cream mix within the tube about which the jacket is disposed. The expanded chilled air is introduced into the ice cream mix entering the freezer as the air to be incorporated during overrun. This chilled air precools the mix due to its intimate contact with the particles of the mix so that more efficient use of the refrigerating medium is made. This enables me to save the refrigeration load which is imposed in attempting to freeze a mix having incorporated therein particles of warm air and give the whipped mix heat insulating properties.

In the accompanying drawings which form part of the instant specification and which are to be read in conjunction therewith and in which like reference numerals are used to indicate like parts in the various views:

Figure 1 is a diagrammatic view showing one form of apparatus employing my invention and capable of carrying out the process of my invention.

Figure 2 is a sectional view drawn on an enlarged scale showing the details of construction of the freezer embodying one form of my invention and capable of carrying out the process of my invention.

Figure 3 is a sectional view drawn on an enlarged scale taken along the line 3—3 of Figure 2 showing the construction of the whipping nozzle.

More particularly referring now to the drawings, the ice cream mix, which may have any suitable composition, is stored in a vat 10 from which it is pumped through pipe 12 by means of a pump 14 through a homogenizer 16, thence through pipe 18 to a mixing nozzle 20 of my freezer. A plurality of bottles 22, 24 and 26 of a compressed inert gas such as air, nitrogen, oxygen or carbon dioxide, are connected to a gas manifold 28. When I say "inert gas" I mean a gas which will not deleteriously affect an ice cream mix. The bottle 22 communicates with the manifold 28 by means of a valve 30, the bottle 24 communicates with the manifold 28 by means of a valve 32 and the bottle 26 communicates with the manifold by means of a valve 34. Interbottle valves 35, 37 and 39 are provided between bottles. The arrangement is such that one or a group of bottles of gas may be employed. If, for example, bottle 26 were in use, valve 35 would be closed and valve 34 would be opened. As the pressure drops in bottle 26, valve 37 is closed, valve 35 is opened, valve 34 is closed and valve 32 is opened. This will place bottle 24 in communication with the manifold 28. Bottle 26 may then be removed and replaced by a new bottle of compressed gas. By means of the manifold arrangement using a plurality of bottles a continuous supply of gas may be provided.

Referring now to Figure 2, the compressed gas passes through the manifold 28 to an expansion chamber 40 through a plurality of expansion valves 42 controlled by knobs 44. Each of the valves is provided with a valve housing 46. The gas in expanding becomes chilled to a very low temperature. The chilled gas in chamber 40 is in contact with a tube 48 through which the ice cream mix passes. The exterior of the tube 48 may be provided with a plurality of heat exchange fins 50 providing sufficient heat exchange between the cold expanded gas and the ice cream mix within the tube 48. The chamber 40 is formed by the casing 52 and the tube 48. The cylindrical casing 52 is provided with an upper cover 54 and a lower cover 56 secured thereto in any suitable manner. The exterior of the freezer casing is provided with heat insulating lagging 58. The housings 46 of the expansion valves 42 are also provided with heat insulating material 60. The refrigerated chamber 40 is provided with a relief valve 62 to insure that pressure does not build up therein. The pressure within the chamber 40 is indicated by a pressure gauge 64. The chilled expanded gas leaves the chamber 40 through pipe 66 and passes into a whipping nozzle chamber 68, through which the pipe 18 containing the mix passes. The end of pipe 18 is provided with a plurality of spiral vanes 70 to give the mix emerging into a diverging passageway 72 a rotary motion. The front plate 74 of the mixing nozzle 20 is provided with a plurality of angularly directed openings 76, as can readily be seen by reference to Figure 3. These openings are directed to give the chilled expanded gas a rotary motion in the same direction as the rotary motion imparted to the mix by the vanes 70. The gas whirling with the mix will become thoroughly incorporated therewith, serving to whip the mix and produce overrun. The rate of overrun may be varied by controlling the volume of the gas by means of control knobs 44 with respect to the volume of the mix by controlling the speed of the pump 14. By incorporating the chilled expanded gas with the mix the mix becomes precooled. When the mix passes through the diverging passageway 72 a further expansion of the gas is permitted so that when the gas reaches the portion of the passageway 78 of greatest cross-sectional area the gas will be at substantially atmospheric pressure. At this point no further reduction in temperature will be obtained by expansion of the gas and the prechilled whipped mix enters the heat exchange tube 48. An auger 80 is mounted upon a shaft 82. The auger is positioned in the tube 48 and rotates to pass the mix through the heat exchange tube and to insure contact with the mix with the refrigerated surface of the tube 48. This further chills and finally freezes and ultimately hardens the mix in its passage through the tube 48 so that as it reaches the bottom of the tube it is an ice cream of the desired consistency and stiffness. A housing 84 extends through the passageway 72. The upper portion of shaft 82 is positioned in the housing 84 and is connected to the output gear of a reduction gear train housed within casing 86. An electric motor 88 furnishes power for rotating the shaft 82 and hence the auger 80. The frozen ice cream is adapted to pass from the tube 48 through a nozzle 90 of rectangular cross-sectional area. The nozzle is normally closed by a flap valve 92 secured to and carried by a shaft 94 passing through the nozzle 90. A spring 96 has one end thereof secured to the shaft 94 and the other end thereof secured to a member 98 which is rotatably carried by the shaft 94. A reciprocating pin 100 is carried by the coverhead 56 and is adapted to engage a plurality of openings 102 formed in the member 98. By rotating the member 98 the tortional bias on the spring 96 can be adjusted and maintained by means of engaging the pin 100 in an opening 102. The spring biases the flap 92 to closed position so that the auger is adapted to feed the ice cream past the flap valve against the action of the spring. The speed of the motor 88 can be controlled to regulate the speed of passage of the ice cream mix being frozen through the freezing tube 48. The auger 80 scrapes ice cream from the inner walls of the freezing tube 48 and prevents portions of ice cream from attaching themselves to the walls and becoming frozen very hard and thus insulating the rest of the mix. The flap valve prevents the ice cream from flowing out of the tube by gravity and permits the ice cream to feed under the control of the auger. The bias on the spring controls the pressure against which the auger feeds and furnishes a simple and convenient way of controlling the stiffness and consistency of the finished ice cream.

It is believed that the operation of my apparatus and the practice of my process will be clear from the foregoing description. In operation, the valves 44 are adjusted to start a flow of gas from the compressed gas bottles through the chilling chamber. This prechills and cools the heat exchange tube 48, the whipping nozzle, the auger and all the parts. After these have been prechilled, the pump 14 is started and the mix is fed to the freezer. Overrun is determined by controlling the speed of the pump 14 with respect to the volume of gas passing into the whipping nozzle. If a greater overrun is desired, more gas and less mix is used. If less overrun is desired, more mix and less gas is used. The parts are designed so that overrun may be varied within reasonable limits. It is to be understood, of course, that a minimum amount of gas is required for the desired freezing action. Accordingly, only ice cream or other confections requiring the incorporation of gas to produce overrun can be frozen in my freezer. Where a lower overrun is desired, it will be necessary to open bleeder valve 65 permitting a portion of the gas to pass to the atmosphere through pipe 67. The cracking of the bleeder valve insures the maintenance of a sufficiently continuous expansion of gas to produce the desired temperature without at the same time requiring that all of the gas be incorporated in the mix. After the gas and the mix are properly proportioned by the adjustment of the speed of the pump 14 the opening of the expansion valves 42 and the proper adjustment of bleeder valve 65, the consistency of the finished ice cream is controlled in two ways. The first control is by the speed of the motor 88. If the ice cream is too stiff, the speed of the motor 88 is increased. If the ice cream is too soft, the speed of the motor 88 is reduced. Small changes in consistency of the finished ice cream can be controlled by the bias on the spring 96. If the ice cream is too stiff, the spring pressure may be reduced, reducing the back pressure against which the auger 80 works. This has the incidental effect of permitting the motor to run a little more rapidly since the load under which it works is reduced. If the ice cream is not stiff enough, the tortional bias of the spring 96 is increased. This increases the back pressure against which the auger 80 operates and has the incidental effect of reducing the motor speed.

During the operation the pressure gauge 64 is watched and when the pressure drops a new bottle of gas is cut in by opening the proper gas manifold and bottle valves and the exhausted bottle is removed and replaced by a fresh bottle. Bottled gas is available in rural communities and the large capital investment for expensive machinery can be avoided. The use of a tube in the auger precludes any corners or dead spaces so that when freezing is changed from one flavor to another the marbling is avoided in successive runs. There is no danger that old hardened mix will contaminate a subsequent run. In changing from one flavor to another, small adjustments are required to accommodate for the variations in specific heats produced by the different flavors. The auger insures that the flavor is well blended so that a uniform ice cream is produced once the adjustments are made for proper continuous operation with a given mix.

A comparatively small equipment can produce large volumes of ice cream in a simple, convenient and expeditious manner by means of my apparatus and method. Besides the motor and reduction gear there is a single moving part, namely, the auger, in addition to the flap valve. The finished ice cream is passed to a suitable container deposited beneath the outlet, and containers are filled rapidly in succession and then stored in the hardening room until ready for distribution and use. The nozzles and the various parts of the equipment are proportioned to provide an ice cream of the desired consistency with an overrun of 100% from an average ice cream mix. Variations in mixes and variations in desired consistency can well be accommodated for by the adjustments pointed out above.

It will be seen that I have accomplished the objects of my invention.

I have provided a continuous ice cream freezer having no mechanical refrigeration capable of being constructed at a low cost in which bottled compressed inert gas, such as air or nitrogen, is used. The compressed gas is expanded to provide the necessary refrigeration by heat exchange and to pre-cool the ice cream mix by direct incorporation of the chilled expanded gas with the mix being frozen as the gas used in obtaining overrun. My continuous ice cream freezer is simple to operate, and due to the fact that the chilled gas incorporated in the mix is at a low temperature the refrigeration load is reduced.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is therefore to be understood that my invention is not to be limited to the specific details shown and described.

Having thus described my invention, what I claim is:

1. A continuous ice cream freezer including in combination a tube, an auger, means for rotatably mounting said auger in said tube, a prime mover for rotating the auger, a housing surrounding the tube and forming an annular refrigerating jacket therewith, a duct having one end thereof communicating with said tube, a mixing nozzle positioned in the other end of the duct, a conduit for introducing an ice cream mix to the mixing nozzle, a pipe providing communication between the jacket and the mixing nozzle, a source of compressed gas, means providing communication between the compressed gas source and the jacket, an expansion valve positioned in the communicating means adapted to expand the compressed gas to chill it, the construction being such that the chilled, expanded gas will chill the ice cream mix passing through the tube by heat exchange and the expanded chilled gas will be admixed with the ice cream mix in the mixing nozzle to precool the mix.

2. A continuous ice cream freezer as in claim 1 in which the source of compressed gas comprises a manifold, a plurality of bottles of compressed gas, means providing communication between the bottles of gas and the manifold, valves in each of the communicating means and valves in the manifold between the communicating means, the construction being such that one or a plurality of bottles of compressed gas will be placed in communication with the manifold.

3. A continuous ice cream freezer as in claim 1, in which the tube is provided with heat exchange fins on the exterior thereof extending into the jacket.

4. A continuous ice cream freezer as in claim 1 in which the tube is provided with an outlet end, a valve adapted to close the outlet end, a spring normally biasing the valve to move to closed position, the construction being such that the ice cream mix will move out of the outlet against the action of the valve spring.

5. A continuous ice cream freezer as in claim 1 in which the pipe extending between the jacket and the mixing nozzle is provided with a branch pipe communicating with the atmosphere and a bleeder valve for controlling the branch pipe whereby a portion of the chilled gas passing from the jacket to the mixing nozzle may be bled to the atmosphere.

6. A continuous ice cream freezer as in claim 1 in which the duct between the mixing nozzle and the tube is formed with an increasing cross-sectional area in the direction of movement from the nozzle to the tube.

7. A method of freezing ice cream including the steps of mixing a chilled gas with an ice cream mix to precool the same in a mixing zone, chilling the precooled mix by heat exchange with an expanded gas in a heat exchange zone, passing the expanded gas from the heat exchange zone to the mixing zone as the chilled gas being incorporated in the mix, and continuously expanding a compressed gas in the heat exchange zone to supply the chilled, expanded gas.

8. A method as in claim 7 in which the chilling step includes passing the precooled mix in an elongated, confined stream whereby the mix will be chilled to a progressively lower temperature to form an ice cream having the desired consistency.

9. A method as in claim 7 including the step of bleeding a portion of the gas passing from the heat exchange zone to the mixing zone to the atmosphere.

10. A method as in claim 7 including the step of creating a resistance to the passage of the ice cream mix through the chilling zone, and discharging the chilled ice cream mix from the chilling zone against the resistance.

WALTER L. MURPHY.

References Cited in the file of this patent

UNITED STATES PATENTS

| Number | Name | Date |
|---|---|---|
| 1,533,708 | Pfouts | Apr. 14, 1925 |
| 1,983,301 | Morgan | Dec. 4, 1934 |
| 2,131,511 | Gray | Sept. 27, 1938 |
| 2,272,715 | Lindsey | Feb. 10, 1942 |
| 2,290,214 | Smith | July 21, 1942 |
| 2,411,081 | Carothers | Nov. 12, 1946 |

FOREIGN PATENTS

| Number | Country | Date |
|---|---|---|
| 348,364 | Great Britain | May 14, 1931 |
| 374,673 | Great Britain | |